J. J. GEARY.
SPAR TREE RIGGING DEVICE.
APPLICATION FILED JAN. 29, 1919.
1,317,871.
Patented Oct. 7, 1919.
2 SHEETS—SHEET 1.
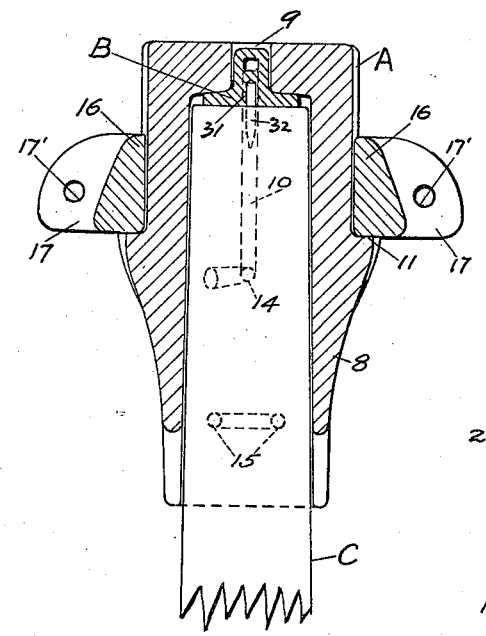
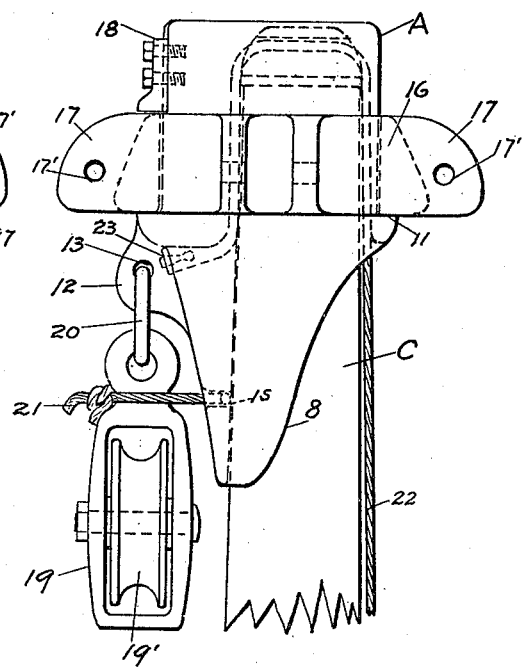
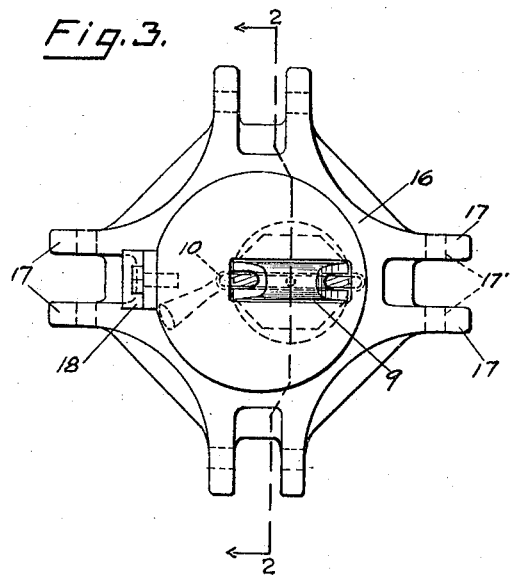
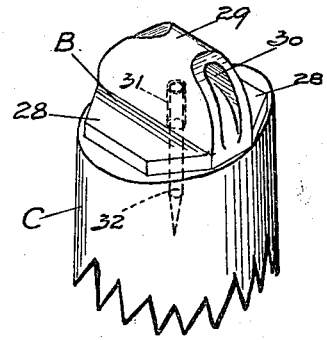
JAMES J. GEARY,
Inventor,
By R.C. Wright
Atty.

J. J. GEARY.
SPAR TREE RIGGING DEVICE.
APPLICATION FILED JAN. 29, 1919.
1,317,871.
Patented Oct. 7, 1919.
2 SHEETS—SHEET 2.
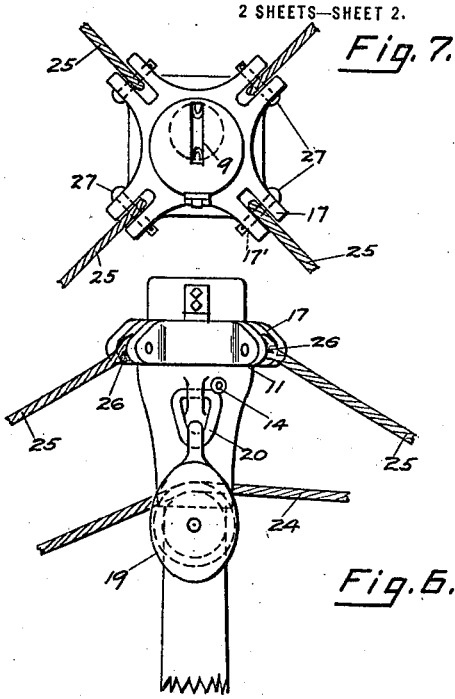
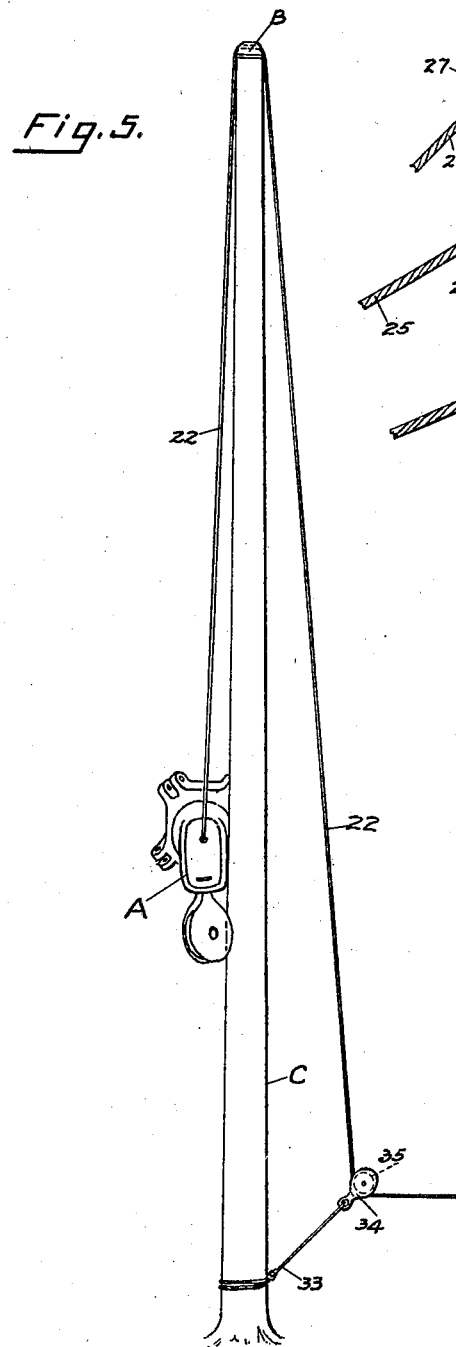
JAMES J. GEARY,
Inventor,
By R. C. Wright
Atty.

UNITED STATES PATENT OFFICE.

JAMES J. GEARY, OF CLATSKANIE, OREGON.

SPAR-TREE RIGGING DEVICE.

1,317,871.  Specification of Letters Patent.  Patented Oct. 7, 1919.

Application filed January 29, 1919. Serial No. 273,775.

*To all whom it may concern:*

Be it known that I, JAMES J. GEARY, a citizen of the United States, residing at Clatskanie, in the county of Columbia and State of Oregon, have invented a new and useful Improvement in Spar-Tree Rigging Devices, of which the following is a specification, reference being had to the accompanying drawings.

My invention relates to a class of devices used in logging operations.

The object of my invention is to provide a rigging device for the top of a spar tree, by means of which the spar may be guyed properly and the hauling cable operated through a snatch-block attached to the device in such a manner that the tension on the cable will not cause the mechanism to cut or break the spar tree, and at the same time allows the cable at all times automatically to adjust the block to the proper alinement of cable tension. I attain these objects, as well as other advantages, by the construction, combination and arrangement of parts illustrated in the accompanying drawings which form a part hereof.

Figure 1 is a side elevation of the device in position on the top of a spar tree.

Fig. 2 is an elevation in section in the same position on line 2—2 of Fig. 3.

Fig. 3 is a top plan view.

Fig. 4 is a perspective view of a spar tree top with hoisting line guide and support in position thereon.

Fig. 5 is an elevation of a spar tree showing guide and support on its top, with hoisting line in position to draw the block rigging over the top or to lower it.

Fig. 5ª is a similar view of part of a spar tree, with rigging at the top about to be drawn over or lowered.

Fig. 6 is a side elevation showing the rigging in operative position with guy lines secured and hauling cable in the block.

Fig. 7 is a plan view of the guy collar and parts of the member A beyond.

Like letters and numerals refer to like parts in all views.

In the device A is a spar cap rigging, B is a support for same and a guide for a hoisting line. C is a spar tree. The member A is of cylindrical form, recessed within and extends downward in a shank 8. It also has a transverse slot 9 in its upper end, preferably to one side of the center, an interior longitudinal recess 10 in its upper part, an exterior shoulder 11, a lug 12 on the exterior central part of the shank 8 in a desired position, said lug having a transverse eye 13 therein, an opening 14 through the shank adjacent to the lug 12, and two openings 15 in the lower part of the shank below the lug. A guy line collar 16 is provided, adapted to rest upon and rotate on the shoulder 11 of the member A. The collar 16 has four horizontal pivoting lugs 17, extending outwardly therefrom and provided with transverse pin bearings 17' therein. A securing means 18 is provided upon the member A in a position to retain the collar 16 rotatably on the shoulder 11. The means 18 consists of the bar secured to the member A by bolts, as shown in the drawings, the lower end of which bar is in position to engage the upper surface of the collar 16 to prevent it from moving upwardly on the member A. A snatch block 19 of common type, with pulley 19', is suspended by a means 20 in the opening 13 of the lug 12. A chain or line 21 extends through the openings 15 and about the block 19 to retain it in a desired position when the device is hoisted. A hoisting line 22 extends from below into the cap A and outwardly through the opening 14, being secured exteriorly by the means 23. A draft line 24 extends through the block 19 over its pulley 19'. Guy lines 25, having eyes 26, are provided, and are pivoted on pins 27 extending through the lug bearings 17' of the collar lugs 17. The member B has a horizontal base 28, a vertical transverse lug 29 with a longitudinal opening 30 through the lug and a vertical bearing 31 in the central lower part. A vertical pivot pin 32 is provided, upon which the member B may be mounted in its bearing 31 in rotatable position. The spar tree C is cut transversely and upon even plane at a desired height. The pin 32 is driven downward in its top in vertical position. The member B is pivoted upon the pin 32 and the hoisting line 22 passed through the opening 30 of the member B. The line 22 may be temporarily guyed near the lower part of the spar C. This is accomplished by a guy line 33 secured at one end to the lower part of the spar and having secured to its opposite end a snatch block 34 having a pulley 35, the line 22 passing through said block and over its pulley.

It will now be seen that the spar tree must be first prepared by cutting it horizontally at a suitable height and shaping it so that the member A will fit over it with freedom of rotatory movement. The pin 32 is then driven in the center of the upper horizontal plane of the spar B. The member B is then placed upon the pin 32 in horizontally rotatable position. The member A is then adjusted over the member B, the lug 29 of the latter passing into the opening 9 of the former. In this position the member A rotates with the member B. In placing the member A, the snatch block is first secured in the position shown in Fig. 1 by the line 21. The object of this is to use the block to balance the weight of the member A so that it may be drawn upwardly into a position as shown in Fig. 5ª and will adjust itself automatically to slip downward over the spar top and the supporting member B, as shown in Fig. 1, otherwise it would be drawn upwardly in a horizontal position and would not adjust as stated. When the device is thus set, the line 21 is removed and the guy lines are placed in the collar 16 on the pivot pins 27 and their opposite ends secured near the earth in desired positions. The draft line or cable 24 is passed through the snatch-block 19 and the whole device is in operative position.

It will be further observed that when the line 24 is under tension the cap A rotates on and with the member B which is pivoted on the pin 32, the collar 16, with the guy lines remaining stationary. This allows the snatch-block 19 at all times to position itself automatically so that its pulley 19' is in the proper alinement with the direction of the tension of the cable 24. The guy lines upon the collar retain the spar tree in rigid vertical position. When it is desired to remove the device, the hoisting line is drawn until it raises the member A high enough to fall away from the member B. It may be assisted in this by drawing upon the guy lines. When it is free from the member B it is easily lowered by the hoisting line. This line passes through the member B and hence cannot be shifted from its position therein. The recess 10 in the member A allows the line 22 to remain within its interior without friction against the spar tree or the member. The slot 9 is preferably at one side of the center of the member A in order to have the greater mass of its material on the side where the block 19 is secured and add to the strength of the cap in sustaining the strain caused by the tension of the block while in operation. It will also be seen that the recess 10 within the member A provides a space wherein the hoisting line 22 may remain when the cap is in operative position and in its rotation it will not engage and destroy the line. It is of course understood that the member A and the spar top will be lubricated to facilitate freedom of operation.

I claim—

1. In a device of the character described, the combination of a member A, being a spar cap rigging of cylindrical form, recessed within and extending downward in a shank, also having a transverse slot in the upper end, an exterior circumferential shoulder above the shank, a lug upon the exterior upper part of the shank, a guy line collar resting upon the shoulder of the member A and having means thereon to secure guy lines to said collar, a snatch-block secured in swinging position in the lug of the member A, a hoisting line extending within the member A and secured to it, a member B, being a support for the member A and a guide for said hoisting line, said member B having a horizontal base, a vertical lug with a horizontal opening through the same to receive the hoisting line and a central vertical pivot bearing, the lug of the member B being adapted to pass into the slot of the member A to retain the member A in supported position upon the member B, and a vertical pivot pin within the bearing of the member B, upon which the said member may be rotated together with the member A within its said collar while the collar is retained in rigid position, substantially as described.

2. In a device of the character described, the combination of a spar tree with a member A, being a spar cap rigging of cylindrical form, recessed within and extending downward in a shank, also having a transverse slot in the upper end, an exterior circumferential shoulder above the shank, a lug upon the exterior upper part of the shank, a guy line collar resting upon the shoulder of the member A and having means thereon to secure guy lines to said collar, a snatch-block secured in swinging position in the lug of the member A, a hoisting line extending within the member A and secured to it, a member B, being a support for the member A and a guide for said hoisting line, said member B having a horizontal base, a vertical lug with a horizontal opening through the same to receive the hoisting line and a central vertical pivot bearing, the lug of the member B being adapted to pass into the slot of the member A to retain the member A in supported position upon the member B, a vertical pivot pin driven into the top of said spar tree, its upper end extending into the bearing of the member B so that it may be rotated thereon with the member A within its collar, guy lines to retain the collar in rigid position, and means to retain the said snatch-block in a desired position to balance the weight of the member A when being drawn over the top of said spar tree so that it will adjust itself and drop downwardly upon the same in the manner of a cap thereon, substantially as described.

3. In a device of the character described, the combination of a spar tree with a member A, being a spar cap rigging of cylindrical form, recessed within and extending downward in a shank, also having a transverse slot in the upper end, an exterior circumferential shoulder above the shank, a lug upon the exterior upper part of the shank, a guy line collar resting upon the shoulder of the member A and having means thereon to secure guy lines to said collar, a snatch-block secured in swinging position in the lug of the member A, a hoisting line extending within the member A and secured to it, a member B, being a support for the member A and a guide for said hoisting line, said member B having a horizontal base, a vertical lug with a horizontal opening through the same to receive the hoisting line and a central vertical pivot bearing, the lug of the member B being adapted to pass into the slot of the member A to retain the member A in supported position upon the member B, a vertical pivot pin driven into the top of said spar tree, its upper end extending into the bearing of the member B so that it may be rotated thereon with the member A within its collar, guy lines to retain the collar in rigid position, means to retain the said snatch-block in a desired position to balance the weight of the member A when being drawn over the top of said spar tree so that it will adjust itself and drop downwardly upon the same in the manner of a cap thereon, and a draft line passing through the aforesaid snatch-block of the member A, substantially as described.

JAMES J. GEARY.

Witnesses:
FRED FOGEL,
CHRIS JOHNSON.

Copies of this patent may be obtained for five cents each, by addressing the "Commissioner of Patents, Washington, D. C."